US012045879B2

(12) United States Patent
Rapowitz et al.

(10) Patent No.: US 12,045,879 B2
(45) Date of Patent: Jul. 23, 2024

(54) SYSTEMS AND METHODS FOR SECURING RISK IN BLOCKCHAIN NETWORKS

(71) Applicant: Capital One Services, LLC, McLean, VA (US)

(72) Inventors: Samuel Rapowitz, Roswell, GA (US); Kevin Osborn, Newton Highlands, MA (US); Xiaoguang Zhu, New York, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 37 days.

(21) Appl. No.: 17/851,437

(22) Filed: Jun. 28, 2022

(65) Prior Publication Data

US 2023/0419403 A1    Dec. 28, 2023

(51) Int. Cl.
*G06Q 40/03* (2023.01)
(52) U.S. Cl.
CPC .................. *G06Q 40/03* (2023.01)
(58) Field of Classification Search
None
See application file for complete search history.

(56) References Cited

U.S. PATENT DOCUMENTS

| | | | |
|---|---|---|---|
| 11,074,648 B1 | 7/2021 | Duccini et al. | |
| 11,139,955 B1 | 10/2021 | So et al. | |
| 2007/0203852 A1* | 8/2007 | Cameron | G06Q 20/367 |
| | | | 705/65 |
| 2020/0027066 A1 | 1/2020 | Ramasamy et al. | |
| 2022/0058732 A1* | 2/2022 | Reses | G06Q 20/065 |

(Continued)

FOREIGN PATENT DOCUMENTS

| | | | | |
|---|---|---|---|---|
| CN | 114638689 A | * | 6/2022 | |
| WO | WO-2016030110 A1 | * | 3/2016 | G06F 21/445 |

OTHER PUBLICATIONS

Google Patents English Language Translation of CN114638689A. https://patents.google.com/patent/CN114638689A/en?oq=CN+114638689+A (Year: 2022).*

(Continued)

*Primary Examiner* — Ayal I. Sharon
(74) *Attorney, Agent, or Firm* — TROUTMAN PEPPER HAMILTON SANDERS LLP; Christopher J. Forstner; John A. Morrissett

(57) ABSTRACT

The disclosed technology relates to assessing and securing credit risk using creditworthiness tokens issued in a blockchain network responsive to particular financial events. An exemplary blockchain node device may store an issuance smart contract associated with an identity and including a first wallet address and allocation parameters. An event query may be sent to an oracle device external to the blockchain network. The event query may include the identity. Event data associated with the identity may then be received from the oracle device in response to the event query. A number of creditworthiness tokens is determined based on an application of the allocation parameters to the event data. The determined number of creditworthiness tokens is then allocated to the identity via the first wallet address. Thereafter, the creditworthiness tokens can be transferred or collateralized, e.g., and can represent creditworthiness for the identity across financial institutions.

16 Claims, 6 Drawing Sheets

(56) References Cited

U.S. PATENT DOCUMENTS

2022/0215469 A1* 7/2022 Jette .................... H04L 63/123
2022/0327529 A1* 10/2022 Williams ............. G06Q 20/065
2023/0281604 A1* 9/2023 Robell ............... G06Q 20/3672
　　　　　　　　　　　　　　　　　　　　　　　　　705/66

OTHER PUBLICATIONS

Google Patents English Language Translation of WO-2016030110-A1. https://patents.google.com/patent/WO2016030110A1/en?oq=WO+2016030110+A1 (Year: 2016).*
Bansal, G. et al., "Secure Lending: Blockchain and Prospect Theory-Based Decentralized Credit Scoring Model," IEEE Transactions on Network Science and Engineering, Mar. 2020 (11 pages).
"New DeFI platform CreDA looks to de-risk the world of crypto," Globe Newswire, Nov. 25, 2021 (5 pages).

* cited by examiner

SYSTEMS AND METHODS FOR SECURING RISK IN BLOCKCHAIN NETWORKS

FIELD

The disclosed technology relates to systems and methods for securing risk in blockchain networks and more particularly to informing lending decisions, and facilitating collateralized loans, via tokens issued in blockchain networks that are based on incentivized events and reflect borrower creditworthiness.

BACKGROUND

In many lending environments, credit scores issued by national credit bureaus are used to evaluate the creditworthiness of a borrower. However, credit scores may be a weak indicator of risk because they are not dynamic, not provided in real-time, and not holistic in that they consider only a limited amount of consumer activity, among other deficiencies. Lender financial institutions may use additional data points to inform lending decisions, such as historical financial behavior for a borrower, but this data is generally limited to the data maintained by the particular financial institution, which may have no or a limited prior banking relationship with the prospective borrower. Even if a prior banking relationship does exist, the credit risk data generated based on parameters of that relationship will inherently be limited as the borrower will likely have other loans and financial relationships for which the lending financial institution will not have visibility.

Decentralized ledgers, such as blockchains, are an increasingly important tools in the digital economy. Blockchains can be used to manage, transfer, and lend digital assets, from fine art to currency, the latter often referred to as cryptocurrency. The benefits of blockchain technology include heightened trust in transactions, decentralization of transactions so that no single entity controls the environment, and increased security. The increased security comes, in part, by the fact that the entire record of a digital asset is memorialized and encrypted in a distributed ledger. Another feature of blockchain networks is the ability to store smart contracts that are self-executing software or program code that can automatically facilitate transactions based on stored algorithms or rules as well as communicate external to the blockchain network (e.g., with an oracle) in order to obtain external data that can inform the facilitated transactions.

BRIEF SUMMARY

Examples of the present disclosure provide solutions to issues associated with digital asset lending in blockchain networks. Disclosed embodiments may provide, for example, blockchain node devices that leverage an oracle device to provide data regarding financial events or activity for prospective borrowers. Based on the data, creditworthiness tokens are minted in a blockchain networks and used by the prospective borrowers as evidence of good financial behavior in order to securitize loans, for example. The creditworthiness tokens are fungible and their ownership is tracked via the distributed ledger. The oracle and/or the blockchain network can be decentralized allowing borrowers to accrue financial capital across financial institutions and based on an increased scope of financial events and activities, thereby providing a more granular, holistic, and dynamic creditworthiness metric used to secure risk in blockchain networks.

The disclosed technology may include a blockchain node device in a blockchain network. The blockchain node device may include a processor and memory in communication with the processor and storing instructions that, when executed by the processor, are configured to cause the blockchain node device to perform one or more methods. For example, the blockchain node device may store an issuance smart contract associated with an identity and including a first wallet address, one or more execution timing parameters, and one or more allocation parameters. At a time determined according to the one or more execution timing parameters, an event query may be sent to an oracle device external to the blockchain network. The event query may include the identity. Event data associated with the identity may then be received from the oracle device in response to the event query. The event data may include one or more event parameters associated with financial activity associated with the identity and reported to the oracle device. A number of creditworthiness tokens may then be determined based on an application of the allocation parameters to the one or more event parameters. Each of the number of creditworthiness tokens may then be minted within the blockchain network and the minted creditworthiness tokens may be allocated to the identity via the first wallet address.

The disclosed technology may include another blockchain node device that includes a processor and memory in communication with the processor and storing an issuance smart contract that, when executed by the processor, are configured to cause the blockchain node device to perform one or more methods. For example, the blockchain node device may send a token query to an oracle device at a time determined according to one or more execution timing parameters defined in the issuance smart contract. The oracle device may be external to a blockchain network hosting the issuance smart contract and the token query may include an identity identified in the issuance smart contract. A number of creditworthiness tokens may then be received in response to the token query. The number of creditworthiness tokens may be determined based on event data for a financial transaction reported to the oracle device and associated with the identity. The number of creditworthiness tokens may then be allocated to the identity via a first wallet address in the blockchain network and identified in the issuance smart contract.

The disclosed technology may include yet another blockchain node device that includes a processor and memory in communication with the processor and storing instructions that, when executed by the processor, are configured to cause the blockchain node device to perform one or more methods. For example, the blockchain node device may store an issuance smart contract associated with an identity and including a first wallet address in a blockchain network and allocation parameters. An event query may be sent to an oracle device external to the blockchain network. The event query may include the identity. Event data associated with the identity may then be received from the oracle device in response to the event query. A number of creditworthiness tokens may be determined based on an application of the allocation parameters to the event data. The determined number of creditworthiness tokens may then be allocated to the identity via the first wallet address.

Other embodiments, features, and aspects of the disclosed technology are described in detail herein and are considered a part of the claimed disclosed technologies. Other embodiments, features, and aspects can be understood with reference to the following detailed description, accompanying drawings, and claims.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner. In the drawings.

DETAILED DESCRIPTION

Figure 1:
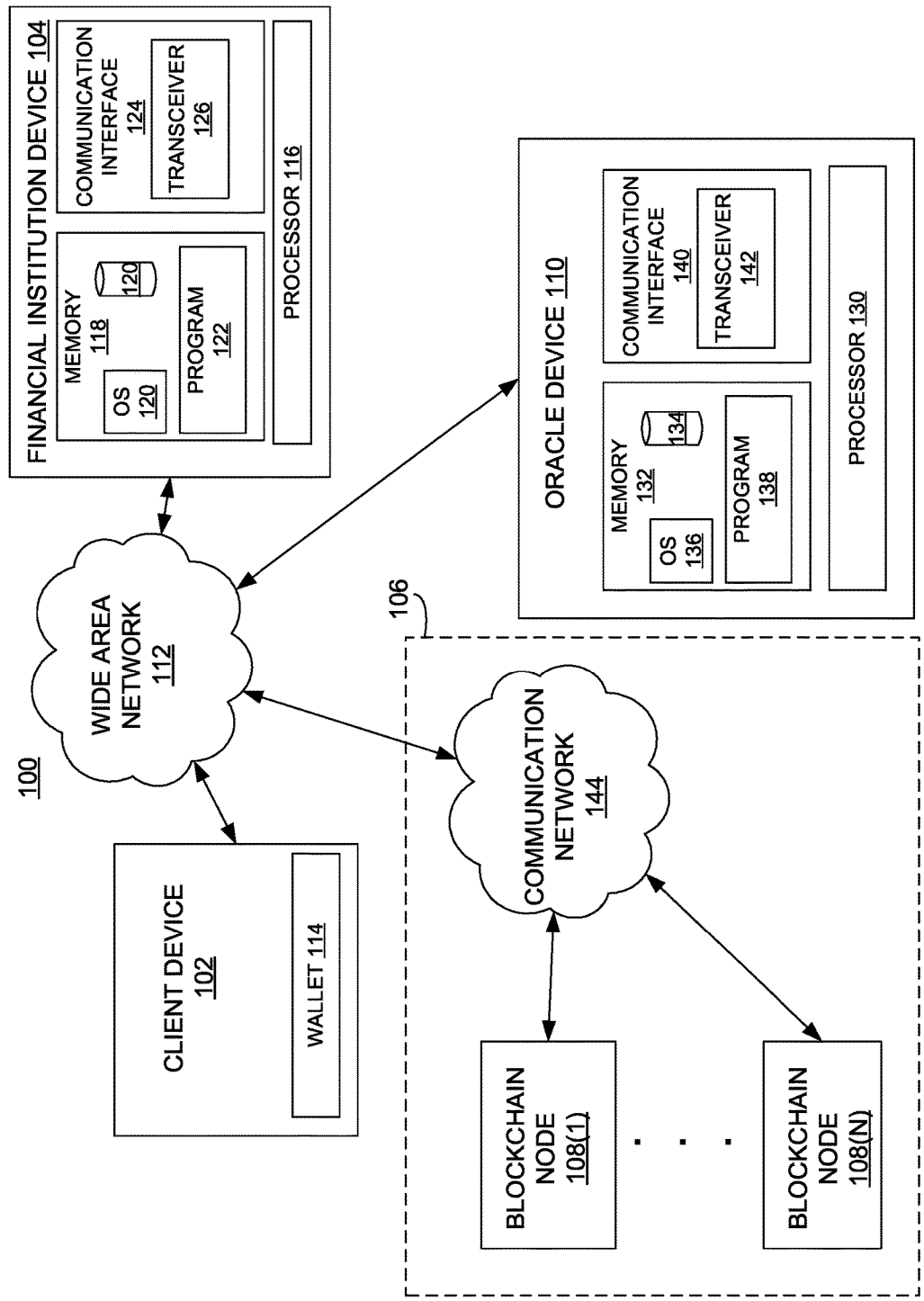
FIG. 1 is a block diagram of an example system environment that includes a client device, a financial institution device, a blockchain network with nodes, and an oracle device, in accordance with one or more examples of the disclosed technology.

While lending is increasingly carried out via blockchain networks and cryptocurrency, irrespective of the platform, lending decisions are currently based on a limited set of information regarding borrowers, which increases the transaction risk. Moreover, financial institutions currently do not have any direct, tangible, and objective way to incentivize good financial behavior (e.g., on-time payment, infrequent credit applications, etc.) that can facilitate reduced risk inherent in a banking relationship and be leveraged to inform lending decisions and/or securitize risk in a lending relationship. Examples of the disclosed technology may be utilized to improve securing risk in a blockchain network 106 by tokenizing creditworthiness based on specifications in an issuance smart contract 210 applied to financial events reported for identities (e.g., users or borrowers) that occur across financial institutions.

In some examples, a financial institution device 104 automatically identifies events (e.g., a loan payment) that occur for users and reports associated event data to an oracle device 110. The financial institution device 104 also stores an issuance smart contract 210 into a blockchain network 106 (e.g., a permissioned blockchain network) that includes a specification (e.g., rules or algorithms) for managing the issuance and allocation of creditworthiness tokens (e.g., correlating particular events with a specific number of creditworthiness tokens).

The oracle device 110 receives and stores the event data, receives automated queries from a blockchain node 108 executing the issuance smart contract 210, and returns event data associated with entities to the blockchain node 108 in some examples. In other examples, the rules or logic for determining a number of creditworthiness that correspond with particular events can be executed by the oracle device 110, which can return the number of creditworthiness tokens instead of the events data in these examples. Based on the response from the oracle device 110, the blockchain node 108 allocates the number of creditworthiness tokens to addresses of a wallet 114 associated with the identity.

The creditworthiness tokens are inherently fungible and can subsequently be transferred and used by the identity in various ways. In one example, a financial institution device 104 can query the blockchain network 106 for an identity that has applied for an unsecured loan to obtain an indication of the number of creditworthiness tokens originally allocated to the identity and thereby inform the financial institution associated with the financial institution device 104 regarding the risk or creditworthiness of the identity with respect to the requested loan. In another example, a financial institution device 104 can secure a loan based on an amount of creditworthiness tokens. In this example, the financial institution device 104 can store a loan smart contract in the blockchain network 106 that automatically transfers the collateralized creditworthiness tokens to a wallet, for example, associated with the financial institution associated with the financial institution device 104 in the event of a default by the borrower.

As will be described and illustrated in more detail below, by leveraging a decentralized blockchain network 106 and oracle device 110, this technology improves securing risk in blockchain networks, more effectively incentivizes good financial behavior, and improves the confidence with which lenders loan assets, including digital assets. Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to exemplary embodiments of the disclosed technology, examples of which are illustrated in the accompanying drawings and disclosed herein. Wherever convenient, the same reference numbers will be used throughout the drawings to refer to the same or like parts.

FIG. 1 is a block diagram of an example system environment 100 that includes a client device 102, a financial institution device 104, a blockchain network 106 with blockchain nodes 108(1)-108(n), and an oracle device 110, in accordance with one or more examples of the disclosed technology. The client device 102, financial institution device104, blockchain nodes 108(1)-108(n), and oracle device 110, and are coupled together via one or more wide area networks (WANs) 112, for example.

The client device 102 can be a mobile computing device (e.g., a smart phone, tablet computer, smart wearable (e.g., a smart watch), portable laptop computer, voice command device, wearable augmented reality device, or other mobile computing device) or a stationary device (e.g., desktop computer), for example. The client device 102 hosts a wallet 114 (e.g., a wallet application) in this particular example, although other types of payment clients configured to manage digital assets and communicate with the blockchain network 106 can also be used. The wallet 114 can provide an interface for a user to conduct transactions (e.g., payments) and an address for maintaining creditworthiness tokens.

The financial institution device 104 can interface with the client device to management and monitor events, the blockchain nodes 108(1)-108(n) to query for information regarding creditworthiness tokens for identities and store issuance and loan smart contracts, and with the oracle device 110 to report events. The financial institution device 104 can include a processor 116, memory 118, and data storage 120. The processor 116 can include one or more of a microprocessor, microcontroller, digital signal processor, co-processor or the like or combinations thereof capable of executing stored instructions and operating upon stored data.

The memory 118 of the financial institution device 104 can include, in some implementations, one or more suitable types of memory (e.g., volatile or non-volatile memory, random access memory (RAM), read only memory (ROM), magnetic disks, optical disks, hard disks, flash memory, solid state drives, non-transitory computer-readable medium, and the like), for storing files and/or applications (e.g., a web browser application, a widget or gadget engine, and or other applications, as necessary), executable instructions and data.

The memory 118 of the financial institution device 104 can contain an operating system ("OS") 120 that can run program(s) 122. The program(s) 122 can perform one or more functions of the disclosed examples, such as explained in detail below with reference to FIG. 3. The financial institution device 104 can also include a communication interface 124 for communicating with external systems or internal systems. The communication interface 124 can include a transceiver 126 to communicate with compatible devices, for example via short range, long range, or similar technologies that enables the financial institution device 104 to communicate via the WAN 112 described herein.

The oracle device 110 can sit outside the framework of the blockchain network 106, as shown, and can obtain data from both outside and inside the blockchain network 106 as well as communicate with the client device 102, financial institution device 104, and the blockchain nodes 108(1)-108(n). In particular, the oracle device 110 can obtain and store event data received from the financial institution device 104 and provide the event data to the blockchain nodes 108(1)-108(n) upon request. The event data can be used by the blockchain nodes 108(1)-108(n) to determine a number of creditworthiness tokens to allocate, deallocate, and/or transfer, for example.

The oracle device 110 can include a processor 130, memory 132, and data storage 134. The processor 130 can include one or more of a microprocessor, microcontroller, digital signal processor, co-processor or the like or combinations thereof capable of executing stored instructions and operating upon stored data.

The memory 132 of the oracle device 110 can include, in some implementations, one or more suitable types of memory (e.g., volatile or non-volatile memory, RAM, ROM, magnetic disks, optical disks, hard disks, flash memory, solid state drives, non-transitory computer-readable medium, and the like), for storing files and/or applications (e.g., a web browser application, a widget or gadget engine, and or other applications, as necessary), executable instructions, and data.

The memory 132 of the oracle device 110 can contain an OS 136 that can run program(s) 138. The program(s) 138 can perform one or more functions of the disclosed examples, such as explained in detail below with reference to FIG. 4. The oracle device 110 can also include a communication interface 140 for communicating with external systems or internal systems. The communication interface 140 can include a transceiver 142 to communicate with compatible devices, for example via short range, long range, or similar technologies that enables the oracle device 110 to communicate via the WAN 112 described herein.

The blockchain nodes 108(1)-108(n) of the blockchain network 106 are coupled together via the communication network 144, which can include local or wide area networks, for example. The communication network 144 can, therefore, facilitate transactions being made in the blockchain network 106 (e.g., trades or payments in cryptocurrency) between the blockchain nodes 108(1)-108(n). The blockchain nodes 108(1)-108(n) can communicate with the wallet 114 of the client device 102 to allocate or transfer creditworthiness tokens, for example, the financial institution device 104 to store issuance and smart contracts as well as allocated creditworthiness tokens, and the oracle device 110 to obtain event data.

Figure 2:
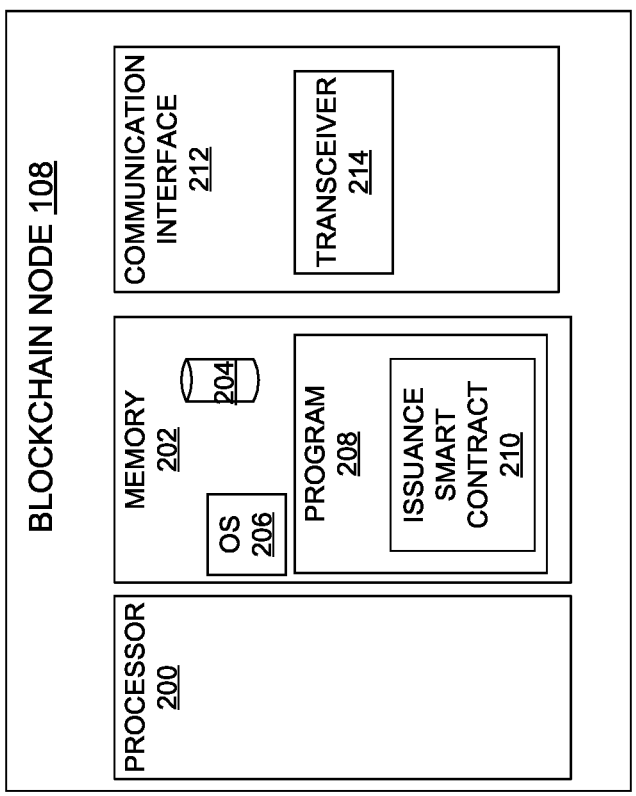
FIG. 2 is a component diagram of a blockchain node, in accordance with one or more examples of the disclosed technology.

FIG. 2 is a component diagram of one of the blockchain nodes 108(1)-108(n), in accordance with one or more examples of the disclosed technology. The blockchain node 108 can include a processor 200, memory 202, and data storage 204 (e.g., a distributed ledger database). The processor 200 can include one or more of a microprocessor, microcontroller, digital signal processor, co-processor or the like or combinations thereof capable of executing stored instructions and operating upon stored data.

The memory 202 of the blockchain node 108 can include, in some implementations, one or more suitable types of memory (e.g., volatile or non-volatile memory, RAM, ROM, magnetic disks, optical disks, hard disks, removable cartridges, flash memory, solid state drives, non-transitory computer-readable medium, and the like), for storing files and/or application, executable instructions, and data. The memory 202 can contain an OS 206 that can run program(s) 208. The program(s) 208 can perform one or more functions of the disclosed examples, as explained in detail below with reference to FIG. 5, for example. The memory 202 can also include any combination of one or more databases controlled by memory controller devices (e.g., server(s), etc.) or software, such as document management systems, Microsoft® SQL databases, SharePoint® databases, Oracle® databases, Sybase® databases, or other relational databases.

In this example, the blockchain node 108 also hosts an issuance smart contract 210 with a specification (e.g., a set of executable instructions). Smart contracts generally may include programs that automatically execute transactions if certain conditions are met, without the need of an intermediary. The issuance smart contract 210 in this particular example is configured to automatically send a request to the oracle device 110, receive a response including event data, determine a number of creditworthiness tokens based on the event data, and allocate the number of creditworthiness tokens (e.g., to the wallet 114. Other types and number of smart contracts can be stored in the memory 202 in other examples, including loan smart contracts described in more detail below with reference to FIG. 6.

The blockchain node 108 can also include a communication interface 212 for communicating with external systems or internal systems. The communication interface 212 can include a serial port, a parallel port, a general-purpose input and output (GPIO) port, a game port, a universal serial bus (USB), a micro-USB port, a high definition multimedia (HDMI) port, a video port, an audio port, a Bluetooth™ port, an NFC port, another like communication interface, or any combination thereof. The communication interface 212 can include a transceiver 214 to communicate with compatible devices, for example via short range, long range, or similar technologies that enables the blockchain node 108 to communicate via the communication network 142 described herein.

Figure 3:
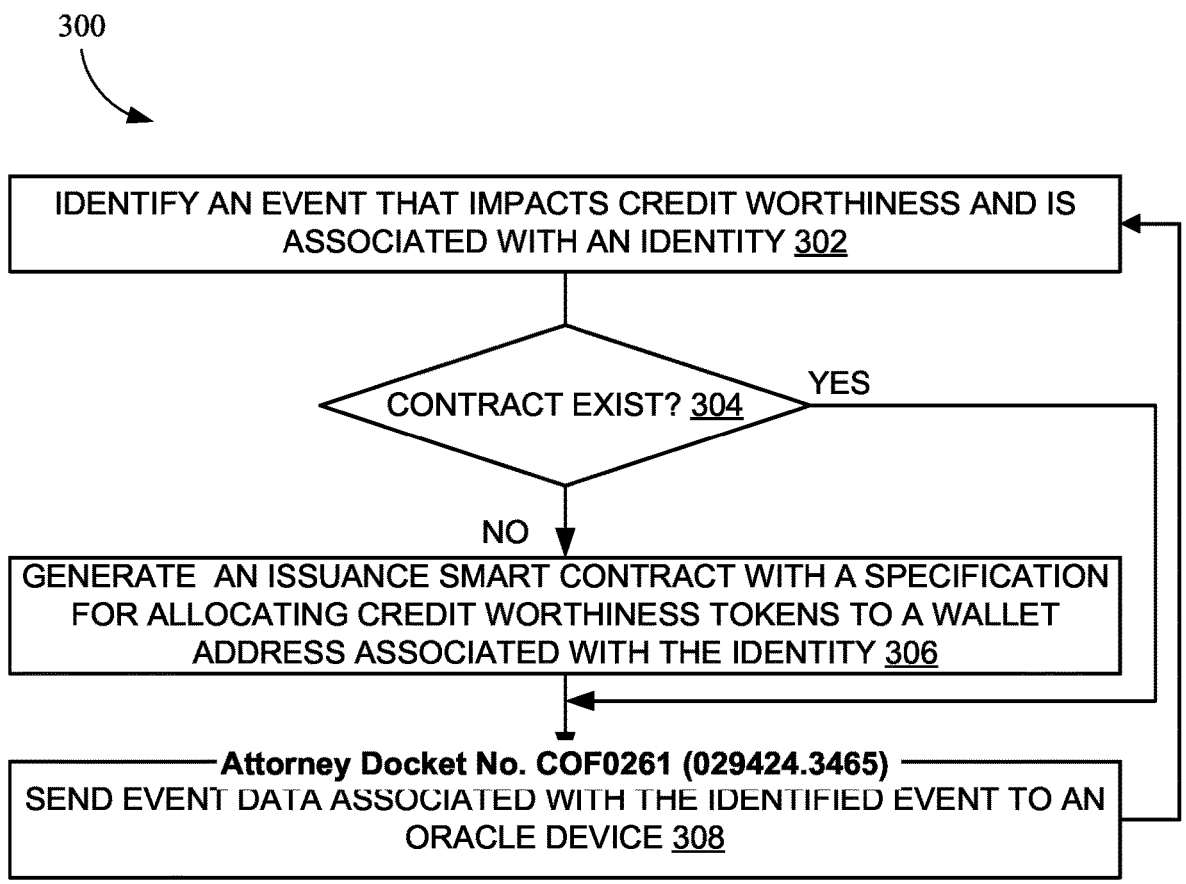
FIG. 3 is a flow diagram of an example method for establishing by a financial institution device an issuance smart contract and communicating event data to an oracle device, in accordance with one or more examples of the disclosed technology.

FIG. 3 is a flow diagram of an example method 300 for establishing by the financial institution device 104 an issuance smart contract 210 and communicating event data to the oracle device 110, in accordance with one or more examples of the disclosed technology. Method 300 may be performed by the financial institution device 104, which includes the processor 116 and memory 118 in communication with the processor 116 and storing instructions. When executed by the processor 116, the stored instructions cause the financial institution device 104 to perform certain functions, such as one or more steps described and illustrated herein with reference to method 300.

In block 302, the financial institution device 104 may identify an event that impacts creditworthiness and is associated with an identity. While only one financial institution device 104 is illustrated in FIG. 1, any number of such devices associated with any number of different financial intuitions can be included in the system environment 100 in other examples. Accordingly, events associated with identities (e.g., unique identifiers for users, customers, and/or borrowers) across financial and/or banking platforms can be monitored and used as described and illustrated herein to manage creditworthiness tokens. The financial institution device 104 can be configured with a policy or set of rules that when applied to event parameters in the event data, which reflect or encapsulate financial activity, trigger the identification of events in block 302. For example, events that are triggers can include financial activity including a loan payoff, a credit score check, an on-time loan payment, a late loan payment, or a loan default, for example, although any number or type of financial activity and/or event can be used. Exemplary event parameters can be factors or attributes associated with the financial activity events, such as the extent of the lateness of a loan payment, the number of credit score checks, or how early an on-time loan payment is made, for example.

The financial institution device 104 in one example executes an application configured to monitor for and identify events. For example, the financial institution device 104 can include a web application via which customers can make loan payments that can be configured to apply a set of rules to actions taken by the customers to determine whether the actions result in the identification of an event predetermined to impact creditworthiness of the customers. In other examples, the identified event can occur on the blockchain network 106 and can be determined based on a periodic or other type of query to the blockchain network. Accordingly, the event can occur off-blockchain and/or on-blockchain, and other methods of identifying events can also be used in other examples.

In block 304, the financial institution device 104 may determine whether an issuance smart contract (e.g., issuance smart contract 210) exists for the identity associated with the event identified in block 302. The determination in block 304 can be made based on querying the blockchain network 106 based on the identity, for example, although other methods for determining whether an issuance smart contract exists for the identity can also be used. If the financial institution device 104 determines that an issuance smart contract does not exist for the identity then the "No" branch is taken to block 306.

In block 306, the financial institution device 104 may generate an issuance smart contract (e.g., issuance smart contract 210) with a specification for allocating creditworthiness tokens to a wallet address (e.g., an address on the blockchain network 106 that is linked to the wallet 114) associated with the identity. The specification can include a self-executing software program that automatically queries the oracle device 110 for event data and applies a set of rules to the event data to determine a number of creditworthiness tokens that should be allocated to the wallet address associated with the identity as a result of the occurrence of the event associated with the event data.

In some examples, the creditworthiness tokens can be Ethereum request for comment-20(ERC-20) tokens minted and allocated on the Ethereum blockchain network, although other types of tokens can also be used. The operation of the issuance smart contract will be described and illustrated in more detail below with reference to FIG. 5. Upon generating the issuance smart contract, the financial institution device 104 in this example sends the issuance smart contract to a blockchain node (e.g., the blockchain node 108) for storage on the blockchain network 106. Subsequent to storing the issuance smart contract in block 306, or if the financial institution device 104 determines in block 304 that an issuance smart contract exists for the identity associated with the identified event data and the "Yes" branch is taken, then the financial institution device 104 proceeds to block 308.

In block 308, the financial institution device 104 may send event data associated with the identified event to the oracle device 110 via the WAN 112, for example. Accordingly, the financial institution device 104 can generate event data based on the identified event that includes the identity associated with the event and metadata associated with the event, such as a category or type of the event, a transaction amount associated with the event, a severity of the event (e.g., number of days late for a late payment), for example, although other types of metadata and/or event data can also be used.

In some examples, one or more portions of the event data corresponds with predefined values in the issuance smart contract specification to facilitate a subsequent correlation between the event data and one or more of the rules defined in that specification. For example, an on-time payment can have a predefined value (e.g., "OTP") that is also recited in the issuance smart contract so that one of the blockchain nodes 108(1)-108(n) can determine whether a rule in the issuance smart contract specification has been satisfied, as explained in more detail below.

Subsequent to sending the event data to the oracle device 110 in block 308, the financial institution device 104 proceeds back to block 302 and continues to monitor activities to identify events associated with identities that impact creditworthiness. One or more of blocks 302-308 can occur in a different order and/or in parallel in other examples. For example, blocks 302-308 can be performed in parallel for any number of events.

Figure 4:
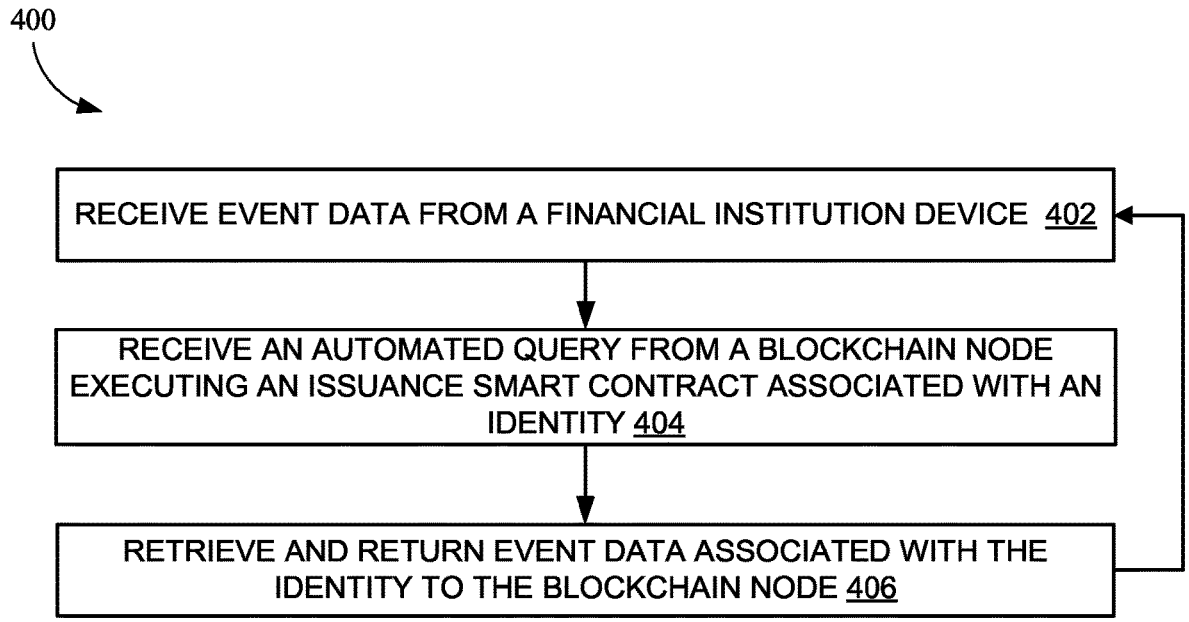
FIG. 4 is a flow diagram of an example method for processing event data at an oracle device to facilitate the minting of creditworthiness tokens by an issuance smart contract executed within a blockchain network, in accordance with one or more examples of the disclosed technology.

FIG. 4 is a flow diagram of an example method 400 for processing event data at the oracle device 110 to facilitate the minting of creditworthiness tokens by the issuance smart contract 210 executed within the blockchain network 106, in accordance with one or more examples of the disclosed technology. Method 400 may be performed by the oracle device 110, which includes the processor 130 and memory 132 in communication with the processor 130 and storing instructions. When executed by the processor 130, the stored instructions cause the oracle device 110 to perform certain functions, such as one or more steps described and illustrated herein with reference to method 400.

In block 402, the oracle device 110 may receive event data from the financial institution device 104. The event data is associated with an identity and could have been sent from the financial institution device 104 as explained above with reference to block 308 of FIG. 3. In other examples, the oracle device 110 can query the financial institution device 104 in order to obtain the event data. For purposes of illustrated only, the oracle device 110 receives the event data from only one financial institution device 104, but the oracle device 110 can receive event data associated with any number of identities from any number of financial institution devices associated with other financial institutions, financial networks, and/or financial platforms in other examples.

Additionally, the oracle device 110 can receive the event data from the financial institution device 104 in addition to, or in replace of, obtaining event data from public blockchain data for one or more blockchain addresses associated with an identity and/or external source data associated with the identity, for example, and other sources of event data can also be used in other examples. By being hosted external to the blockchain network 106, the oracle device 110 can advantageously access external source data and public blockchain data, which can result in a more robust set of event data and an associates creditworthiness token allocation and downstream risk assessments based on creditworthiness tokens.

Upon receipt, the oracle device 110 may store the event data (e.g., in the data storage 134 or another database) as associated with the identity. Optionally, the oracle device 110 may normalize the event data prior to storing the event data so that event data obtained from different financial institutions or sources can be stored in a standardized manner to facilitate subsequent identification, retrieval, and processing, as explained in more detail below.

In block 404, the oracle device 110 may receive an automated event query from the blockchain node 108 executing the issuance smart contract 210 associated with an identity, which can be the identity associated with the event data received in block 402 or a different identity. The issuance smart contract 210 could have been generated as explained above with reference to block 306 of FIG. 3 and stored by the blockchain node 108 as explained below with reference to block 302 of FIG. 3. The issuance smart contract 210 in this example may include execution timing parameter(s) that define when the automated query is initiated from the blockchain node 108 hosting the issuance smart contract 210. In one example, the execution timing parameter(s) may define a periodically query initiated to the oracle device 110 to identify event data associated with an identity, although other executing timing parameters and/or methods and of facilitating identification by the blockchain node 108 of event data for identities can also be used.

In block 406, the oracle device 110 may retrieve and return to the blockchain node 108 event data associated with the identity included in the query received in block 404. In this example, the oracle device 110 may query the data storage 134 based on the identity included in the query to identify and retrieve event data associated with the identity, which could have been stored in block 402, for example. Optionally, the oracle device 110 maintains a timestamp of the most recent query for the identity received from the blockchain node 108, removes the event data from the data storage 134 upon retrieval, and/or otherwise maintains the data storage 134 so that event data for a particular even is only provided once to one of the blockchain nodes 108(1)-108(n).

Subsequent to retrieving the event data, the oracle device 110 returns the event data to the blockchain node 108 in response to the query received in block 404. Optionally, if the data storage 134 does not currently have any event data associated with the identity, the oracle device 110 can return to the blockchain node 108 an empty or null set or another indication that there is no new event data for the identity. One or more of blocks 402-406 can occur in a different order and/or in parallel in other examples. For example, block 402 can be performed in parallel with blocks 404-406 for any number of sets of event data received from any number of devices.

Figure 5:
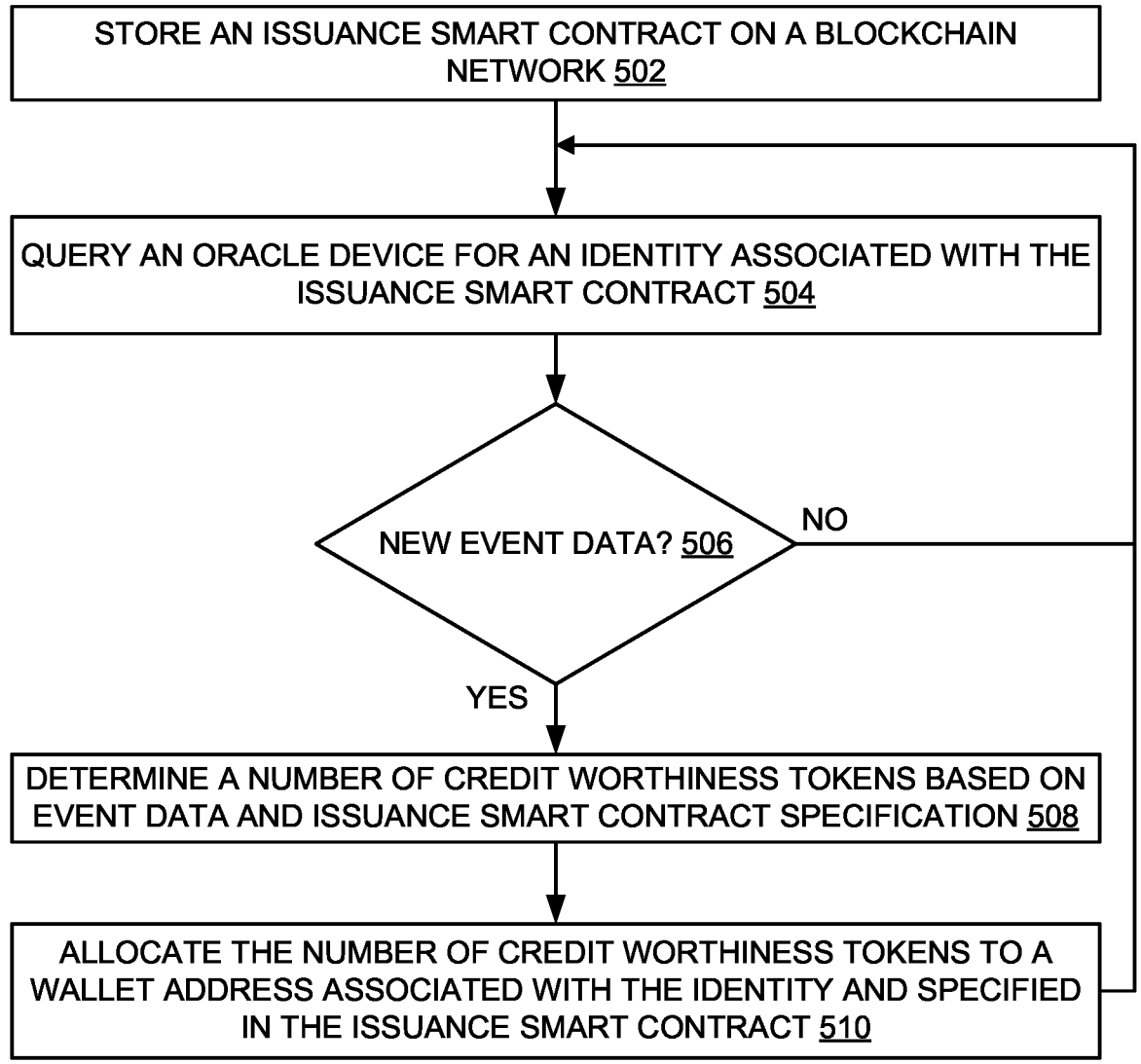
FIG. 5 is a flow diagram of an example method for executing by a blockchain node an issuance smart contract and allocating creditworthiness tokens within a blockchain network, in accordance with one or more examples of the disclosed technology.

FIG. 5 is a flow diagram of an example method 500 for executing by the blockchain node 108 the issuance smart contract 210 and allocating creditworthiness tokens within the blockchain network 106, in accordance with one or more examples of the disclosed technology. Method 500 may be performed by the blockchain node 108, which includes the processor 200 and memory 202 in communication with the processor 200 and storing instructions. When executed by the processor 200, the stored instructions cause the blockchain node 108 to perform certain functions, such as one or more steps described and illustrated herein with reference to method 500.

In block 502, the blockchain node 108 may store the issuance smart contract 210 on the blockchain network 106. The issuance smart contract 210 could have been generated and sent by the financial institution device 104 to the blockchain node 108 as explained above with reference to block 306 of FIG. 3. The issuance smart contract 210 is a self-executing program or application that is configured to obtain event data, process the event data to determine a number of creditworthiness tokens to allocate or adjust according to a set of rules applied to the event data, and allocate the number of creditworthiness tokens to identities, as will now be described and illustrated with reference to blocks 504-510.

In block 504, the blockchain node 108 executing the issuance smart contract 210 may query the oracle device 110 for an identity associated with the issuance smart contract 210. The query can be received by the oracle device 110, and processed by the oracle device 110, as explained above with reference to blocks 404-406 of FIG. 4, for example. Optionally, the query can be sent using an application programming interface (API) provided by the oracle device 110, although other methods of querying the oracle device 110 can also be used in other examples.

In block 506, the blockchain node 108 executing the issuance smart contract 210 may determine whether there is any new event data associated with the identity since a previous query for the identity. Accordingly, in this example, the issuance smart contract 210 is configured to periodically query the oracle device 110 for the identity, but other methods of triggering a query by the blockchain node 108 can also be used. If the blockchain node 108 determines that there is no new event data (e.g., based on an empty or null set or other indication returned from the oracle device 110), then the "No" branch is taken back to block 504 and the blockchain node 108 effectively waits for another trigger for querying the oracle device 110. However, if the blockchain node 108 determines in block 506 that there is new event data for the identity, then the "Yes" branch is taken to block 508.

In block 508, the blockchain node 108 executing the issuance smart contract 210 may determine a number of creditworthiness tokens based on the event data returned by the oracle device 110 and the application of the rules or specification of the issuance smart contract 210 to the event data. Accordingly, the issuance smart contract 210 is pre-configured to correlate event data with a rule set that includes allocation parameters applied to determine the value, with respect to a number of creditworthiness tokens, of an event associated with the event data. Optionally, the specification of the issuance smart contract 210 is standardized across identities such that the same events have the same value or associated number of creditworthiness tokens, across identities, although in other examples particular events can have a higher associated number of creditworthiness tokens for certain identities in order to incentive (or disincentivize) the behavior corresponding to those events.

While the blockchain node 108 determines the number of creditworthiness tokens in this example, in other examples the oracle device 110 can be configured with a rule set that includes allocation parameters corresponding to the specification of the issuance smart contract 210, which it can apply to determine the number of creditworthiness tokens. In these examples, the oracle device 110 can return the number of creditworthiness tokens to the blockchain node 108 instead of the event data, and other arrangements can also be used in yet other examples.

In block 510, the blockchain node 108 executing the issuance smart contract 210 may allocate the number of creditworthiness tokens to a wallet address associated with the identity and specified in the issuance smart contract 210. The address can be associated with the wallet 114 and can be an address on the blockchain network 106. The blockchain node 108 can allocate the number of creditworthiness tokens by minting new tokens within the blockchain network 106, which include metadata such as the identity, a type of, or originating financial institution associated with, the event that resulted in the token issuance, the current owner, and/or a timestamp of allocation, among other types of context information. Minting as used herein refers to the generation of a token on the blockchain network and allocation of the token to a wallet address on the blockchain network. In other examples, the blockchain node 108 can effectively deallocate the number of creditworthiness tokens from the identity by altering the value of previously minted creditworthiness tokens for the identity, and other adjustments can also be made in yet other examples.

Optionally, the wallet address to which the number of creditworthiness tokens is allocated can be accessible across financial intuitions, each of which can scan the blockchain network 106 for the wallet address to identify the number of creditworthiness tokens (e.g., to inform an unsecure lending decision). While a wallet address is used in this example, the address on the blockchain network 106 can correspond to another smart contract or any other data structure or application addressable on the blockchain network 106 in other examples.

Also optionally, a financial institution can effectively hold custody of the number of creditworthiness tokens for any number of identities, while allowing transfer of the tokens. Other methods and configurations for allocating the number of creditworthiness tokens can also be used in other examples. Subsequent to allocating the number of creditworthiness tokens, the blockchain node 108 proceeds back to block 504. One or more of blocks 502-510 can occur in a different order and/or in parallel in other examples. For example, block 502 can be performed in parallel with blocks 504-510 for any number of issuance smart contracts.

As described and illustrated by way of the examples herein, the blockchain nodes of this technology advantageously allocate and manage creditworthiness tokens that provide an objective, holistic, dynamic, and granular view of the creditworthiness of a prospective borrower, for example, in order to reduce risk for lenders and promote positive financial behaviors. The activities or events that yield the minting of creditworthiness tokens can be provided to an oracle device by any number of financial institutions and other third parties. The oracle device can also obtain data relevant to creditworthiness from third party sources that can be used by the blockchain nodes. Accordingly, the creditworthiness tokens are fungible, their ownership is tracked via the distributed ledger, and they reflect merit on the part of owners or holders that can be used to evidence creditworthiness or as collateral for a loan or credit line, for example.

Example Use Case

Figure 6:
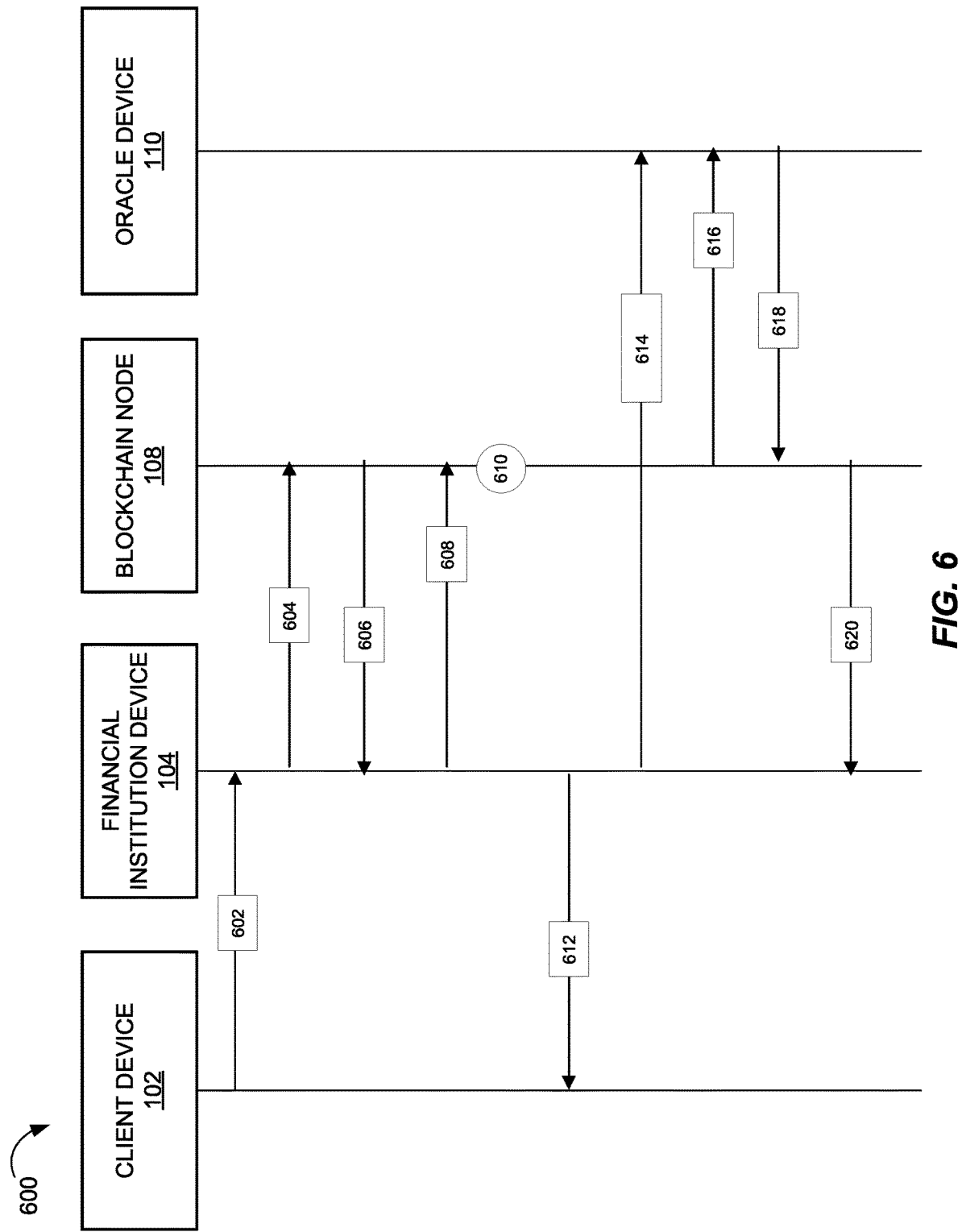
FIG. 6 is a timing diagram of an example method for securing a loan using creditworthiness tokens and executing the loan through a borrower default, in accordance with one or more examples of the disclosed technology.

The following example use case describes an example of a typical user flow pattern. This section is intended solely for explanatory purposes and not in limitation. FIG. 6 is a timing diagram of an example method for securing a loan using creditworthiness tokens and executing the loan through a borrower default, in accordance with one or more examples of the disclosed technology. In block 602, a borrower using the client device 102 may request a securitized loan from a financial institution via an application or interface provided by the financial institution device 104. The request may be in the form of a loan application that includes a unique identity of the borrower.

In block 604, the financial institution device 104 queries the blockchain network 106 based on the unique borrower identity to determine the number of creditworthiness tokens that are held and/or originally allocated to the borrower. Since the creditworthiness tokens are fungible, the borrower may hold (e.g., as acquired from another identity) more creditworthiness tokens than were originally allocated to the borrower, with the originally-allocated portion of the creditworthiness tokens reflecting the merit or creditworthiness of the borrower. In other examples, the financial institution device 104 may not make any distinction between held and originally-allowed creditworthiness tokens. Optionally, the loan application can include a wallet address that is associated with the creditworthiness tokens for the unique borrower identity and can be queried by the financial institution device 104, although other methods of obtaining the number of creditworthiness tokens held and/or originally allocated to the borrower can also be used.

In block 606, the blockchain node 108 responds to the query from the financial institution device 104 on behalf of the blockchain network 106. The response includes the number of creditworthiness tokens associated with the borrower and corresponding to the query parameters, which can filter the number of creditworthiness tokens based on the method by, or date upon, which the creditworthiness tokens were acquired by the borrower, among any number of other parameters).

In block 608, the financial institution device 104 generates a loan smart contract and sends the loan smart contract to the blockchain node 108. The loan smart contract can include a specification that defines parameters associated with the loan including the number of creditworthiness tokens associated with the borrower and held as collateral for the loan. Optionally, the financial institution device 104 can use the number of creditworthiness tokens to generate terms for the loan, such as interest rate and/or the collateral requirements, for example, although other terms can be informed by the number of creditworthiness tokens in other examples.

In block 610, the blockchain node 108 stores the loan smart contract on the blockchain network 106 and executes the specification of the loan smart contract. As a result of the execution of the loan smart contract, the blockchain node 108 can publish to the blockchain network 106 an indication that certain of the creditworthiness tokens associated with the borrower are held as collateral for the loan.

In block 612, the financial institution device 104 sends a message to the client device 102 in response to the loan application and indicating that the loan has been issued, and optionally including one or more terms of the loan. Optionally, the message provides an indication of how to make a loan payment (e.g., via the financial institution device 104) and/or the amount of the loan payment, among other loan information.

In block 614, the financial institution device 104 sends event data associated with the borrower to the oracle device 110. In this particular example, the event data includes an indication of the loan, the unique borrower identity, and a description of the event associated with the event data that indicates that a default of the loan has occurred, although other information can also be included in the event data in other examples.

In block 616, the blockchain node 108 queries the oracle device 110 for event data associated with the unique borrower identity and the loan, as a result of the execution of the loan smart contract. Accordingly, the loan smart contract in this example is configured to request only event data associated with the particular loan from the oracle device 110 and the query to the oracle device 110 in block 616 can include the unique borrower identity and the identifier of the loan, for example, which can be correlated at the oracle device 110. The loan smart contract is separate from an issuance smart contract for the borrower, which can also query the oracle device 110 for event data for the borrower and process the response from the oracle device 110 as described and illustrated in detail above.

In block 618, the oracle device 110 returns a result of the query to the blockchain node 108. The result in this particular example includes an indication of the loan default by the borrower.

In block 620, the blockchain node 108 executing the loan smart contract analyzes the query response from the oracle device 110, determines that the default of the loan has occurred, and, according to the specification of the loan contract, transfers the creditworthiness tokens held as collateral from the borrower to the financial institution that issued the loan and is associated with the financial institution device 104. The transfer can be from the address of the wallet 114 to another wallet or other address on the blockchain network 106 that is associated with the financial institution, for example, although the transfer of the collateral can be carried out in other ways in other examples.

Accordingly, the number of creditworthiness tokens held by the borrower will effectively be reduced as a result of the loan default, and the financial institution will subsequently be the beneficiary of the value of the transferred creditworthiness tokens to the detriment of the borrower. Additionally, the merit of those transferred creditworthiness tokens will be lost with respect to the borrower, which can impact the ability of the borrower to obtain future loans (e.g., by impacting the terms of those loans such that they require more collateral and/or carry a higher interest rate).

In some examples, disclosed systems or methods may involve one or more of the following clauses:

Clause 1: A blockchain node device in a blockchain network, the blockchain node device comprising: one or more processors; and memory in communication with the one or more processors and storing instructions that, when executed by the one or more processors, are configured to cause the blockchain node device to: store an issuance smart contract associated with an identity and comprising a first wallet address, one or more execution timing parameters, and one or more allocation parameters; send at a time determined according to the one or more execution timing parameters an event query to an oracle device external to the blockchain network, wherein the event query comprises the identity; receive event data associated with the identity from the oracle device in response to the event query, wherein the event data comprises one or more event parameters associated with financial activity associated with the identity and reported to the oracle device; determine a number of creditworthiness tokens based on an application of the allocation parameters to the one or more event parameters; and mint each of the number of creditworthiness tokens within the blockchain network and allocate the minted creditworthiness tokens to the identity via the first wallet address.

Clause 2: The blockchain node device of clause 1, wherein the instructions, when executed by the one or more processors, are further configured to cause the blockchain node device to correlate the allocation parameters to one or more of the one or more event parameters to determine the number of creditworthiness tokens.

Clause 3: The blockchain node device of clause 1, wherein the number of creditworthiness tokens corresponds to an impact of the financial activity on a creditworthiness of an entity associated with the financial activity and the identity corresponds to the entity.

Clause 4: The blockchain node device of clause 1, wherein each of the number of creditworthiness tokens is transferable and fungible and the instructions, when executed by the one or more processors, are further configured to cause the blockchain node device to record in each of the number of creditworthiness tokens an indication of an original owner of the creditworthiness token.

Clause 5: The blockchain node device of clause 1, wherein the instructions, when executed by the one or more processors, are further configured to cause the blockchain node device to: store a loan smart contract comprising the first wallet address and a second wallet address associated with a lender; query the oracle device to obtain loan data for a loan associated with the identity and originated by the lender; and transfer one or more of the minted creditworthiness tokens, or a fractional portion of at least one of the minted creditworthiness tokens, from the first wallet address to the second wallet address based on the loan data.

Clause 6: The blockchain node device of clause 5, wherein the loan data indicates that the loan is in default and the loan smart contract defines collateral for the loan corresponding to the transferred one or more of the minted creditworthiness tokens or fractional portion of the at least one of the minted creditworthiness tokens.

Clause 7: The blockchain node device of clause 5, wherein the loan data indicates that a late payment has been made on the loan and the loan smart contract defines a late payment penalty for the loan corresponding to the transferred one or more of the minted creditworthiness tokens or fractional portion of the at least one of the minted creditworthiness tokens.

Clause 8: A blockchain node device, comprising: a processor; and memory in communication with the processor and storing an issuance smart contract that, when executed by the processor, is configured to cause the blockchain node device to: send a token query to an oracle device at a time determined according to one or more execution timing parameters defined in the issuance smart contract, wherein the oracle device is external to a blockchain network hosting the issuance smart contract and the token query comprises an identity identified in the issuance smart contract; receive from the oracle device a number of creditworthiness tokens in response to the token query, wherein the number of creditworthiness tokens is determined based on event data for a financial transaction reported to the oracle device and associated with the identity; and allocate the number of creditworthiness tokens to the identity via a first wallet address in the blockchain network and identified in the issuance smart contract.

Clause 9: The blockchain node device of clause 8, wherein the number of creditworthiness tokens corresponds to an impact of a type of the financial transaction on a creditworthiness of an entity associated with the financial transaction and the identity corresponds to the entity.

Clause 10: The blockchain node device of clause 8, wherein each of the number of creditworthiness tokens is transferable and fungible and the issuance smart contract, when executed by the processor, is further configured to cause the blockchain node device to record in each of the number of creditworthiness tokens an indication of an original owner that is associated with the identity.

Clause 11: The blockchain node device of clause 8, wherein the memory further comprises a loan smart contract that, when executed by the processor, is configured to cause the blockchain node device to: determine whether a loan originated by a lender is in default, wherein the loan smart contract is associated with the identity and defines collateral for a loan comprising a subset of the number of creditworthiness tokens and the loan smart contract comprises a second wallet address associated with the lender; and transfer the subset of the number of creditworthiness tokens from the first wallet address to the second wallet address, when the determination indicates the loan is in default.

Clause 12: The blockchain node device of clause 8, wherein the memory further comprises a loan smart contract that, when executed by the processor, is configured to cause the blockchain node device to: determine whether a late payment on a loan originated by a lender has been made, wherein the loan smart contract is associated with the identity and defines a late payment penalty for the loan comprising a subset of the number of creditworthiness tokens and the loan smart contract comprises a second wallet address associated with the lender; and transfer the subset of the number of creditworthiness tokens from the first wallet address to the second wallet address, when the determination indicates the late payment on the loan has been made.

Clause 13: A blockchain node device, comprising: a processor; and memory in communication with the processor and storing instructions that, when executed by the processor, are configured to cause the blockchain node device to: store an issuance smart contract associated with an identity and comprising a first wallet address in a blockchain network and allocation parameters; send an event query to an oracle device external to the blockchain network, wherein the event query comprises the identity; receive event data associated with the identity from the oracle device in response to the event query; determine a number of creditworthiness tokens based on an application of the allocation parameters to the event data; and allocate to the identity via the first wallet address the determined number of creditworthiness tokens.

Clause 14: The blockchain node device of clause 13, wherein the issuance smart contract further comprises execution timing parameters and the instructions, when executed by the processor, are further configured to cause the blockchain node device to send the event query at a time determined according to the execution timing parameters.

Clause 15: The blockchain node device of clause 13, wherein the event data comprises one or more event parameters for a financial event reported to the oracle device by a financial institution device external to the blockchain network Clause 16: The blockchain node device of clause 13, wherein the instructions, when executed by the processor, are further configured to cause the blockchain node device to correlate the allocation parameters to the event data to determine the number of creditworthiness tokens.

Clause 17: The blockchain node device of clause 13, wherein the number of creditworthiness tokens corresponds to an impact of a type of a financial event on a creditworthiness of an entity associated with the financial transaction, the type of the financial event is determined from the event data, and the identity corresponds to the entity.

Clause 18: The blockchain node device of clause 13, wherein each of the number of creditworthiness tokens is transferable and fungible and the instructions, when executed by the processor, are further configured to cause the blockchain node device to record in each of the number of creditworthiness tokens an indication of an original owner that is associated with the first wallet address.

Clause 19: The blockchain node device of clause 13, wherein the instructions, when executed by the processor, are further configured to cause the blockchain node device to: store a loan smart contract associated with the identity and defining collateral for a loan originated by a lender, wherein the collateral comprises a subset of the number of creditworthiness tokens and the smart contract comprises a second wallet address associated with the lender; query the oracle device to determine whether the loan is in default; and automatically transfer the subset of the number of creditworthiness tokens from the first wallet address to the second wallet address, when the determination indicates the loan is in default.

Clause 20: The blockchain node device of clause 13, wherein the instructions, when executed by the processor, are further configured to cause the blockchain node device to: store a loan smart contract associated with the identity and defining a late payment penalty for a loan originated by a lender, wherein the late payment penalty comprises a subset of the number of creditworthiness tokens and the smart contract comprises a second wallet address associated with the lender; query the oracle device to determine whether a late payment on the loan has been made; and automatically transfer the subset of the number of creditworthiness tokens from the first wallet address to the second wallet address, when the determination indicates the late payment on the loan has been made.

Certain embodiments of the disclosed technology are described above with reference to block and flow diagrams of systems and methods and/or computer program products according to exemplary embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a non-transitory computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A blockchain node device in a blockchain network, the blockchain node device comprising:
   one or more processors; and
   memory in communication with the one or more processors and storing first executable instructions that, when executed by the one or more processors, are configured to cause the blockchain node device to execute second executable instructions of a stored issuance smart contract, comprising a specification comprising an identity, a first wallet address, one or more execution timing parameters, and one or more allocation parameters, to:
      send, at a time determined according to the one or more execution timing parameters, an event query via one or more communication networks to an oracle device external to the blockchain network, wherein the event query comprises the identity;
      receive event data associated with the identity via the one or more communication networks and from the oracle device in response to the event query, wherein the event data comprises one or more event parameters reported to the oracle device via a wide area network by a financial institution device that is separate from the blockchain node device and the oracle device;
      apply the allocation parameters to the one or more event parameters to determine a number of creditworthiness tokens based on an impact of the financial activity on a creditworthiness of an entity associated with the identity;
      mint each of the number of creditworthiness tokens within the blockchain network via a first set of one or more transactions recorded in a distributed ledger database of the blockchain network; and
      allocate the minted number of the creditworthiness tokens to the identity via the first wallet address and a second set of one or more transactions that are recorded in the distributed ledger database and link the minted number of the creditworthiness tokens to the first wallet address.

2. The blockchain node device of claim 1, wherein the instructions, when executed by the one or more processors, are further configured to cause the blockchain node device to correlate the allocation parameters to one or more of the one or more event parameters to determine the number of creditworthiness tokens.

3. The blockchain node device of claim 1, wherein each of the number of creditworthiness tokens is transferable and fungible and the instructions, when executed by the one or more processors, are further configured to cause the blockchain node device to record in each of the number of creditworthiness tokens an indication of an original owner of the creditworthiness token.

4. The blockchain node device of claim 1, wherein the instructions, when executed by the one or more processors, are further configured to cause the blockchain node device to:
store a loan smart contract comprising the first wallet address and a second wallet address associated with a lender;
query the oracle device to obtain loan data for a loan associated with the identity and originated by the lender; and
transfer one or more of the minted number of the creditworthiness tokens, or a fractional portion of at least one of the minted number of the creditworthiness tokens, from the first wallet address to the second wallet address based on the loan data.

5. The blockchain node device of claim 4, wherein the loan data indicates that the loan is in default and the loan smart contract defines collateral for the loan corresponding to the transferred one or more of the minted number of the creditworthiness tokens or fractional portion of the at least one of the minted number of the creditworthiness tokens.

6. The blockchain node device of claim 4, wherein the loan data indicates that a late payment has been made on the loan and the loan smart contract defines a late payment penalty for the loan corresponding to the transferred one or more of the minted creditworthiness tokens or fractional portion of the at least one of the minted creditworthiness tokens.

7. A blockchain node device, comprising a processor and memory in communication with the processor and storing an issuance smart contract and a loan smart contract, wherein one or more of the issuance smart contract or the loan smart contract, when executed by the processor, is configured to cause the blockchain node device to:
send a token query via one or more communication networks to an oracle device at a time determined according to one or more execution timing parameters defined in the issuance smart contract, wherein the oracle device is external to a blockchain network hosting the issuance smart contract and the token query comprises an identity identified in the issuance smart contract;
receive from the oracle device and via the one or more communication networks a number of creditworthiness tokens in response to the token query, wherein the number of creditworthiness tokens is determined based on event data for a financial transaction associated with the identity and reported to the oracle device via a wide area network by a financial institution device that is separate from the blockchain node device and the oracle device;
allocate the number of creditworthiness tokens to the identity via a first wallet address in the blockchain network and identified in the issuance smart contract and a set of one or more transactions that are recorded in a distributed ledger database of the blockchain network and link the number of the creditworthiness tokens to the first wallet address;
determine that a loan originated by a lender is in default, wherein the loan smart contract is associated with the identity, defines collateral for a loan comprising a first subset of the number of creditworthiness tokens, and comprises a second wallet address associated with the lender; and
transfer the first subset of the number of creditworthiness tokens from the first wallet address to the second wallet address via a second set of one or more transactions recorded in the distributed ledger database.

8. The blockchain node device of claim 7, wherein the number of creditworthiness tokens corresponds to an impact of a type of the financial transaction on a creditworthiness of an entity associated with the financial transaction and the identity corresponds to the entity.

9. The blockchain node device of claim 7, wherein each of the number of creditworthiness tokens is transferable and fungible and the issuance smart contract, when executed by the processor, is further configured to cause the blockchain node device to record in each of the number of creditworthiness tokens an indication of an original owner that is associated with the identity.

10. The blockchain node device of claim 7, wherein the loan smart contract, when executed by the processor, is further configured to cause the blockchain node device to:
determine that a late payment on the loan has been made, wherein the loan smart contract defines a late payment penalty for the loan comprising a second subset of the number of creditworthiness tokens; and
transfer the second subset of the number of creditworthiness tokens from the first wallet address to the second wallet address via a third set of one or more transactions recorded in the distributed ledger database.

11. A blockchain node device, comprising:
a processor; and
memory in communication with the processor and storing instructions that, when executed by the processor, are configured to cause the blockchain node device to executed one or more of a stored issuance smart contract, comprising a first specification comprising an identity, a first wallet address in a blockchain network, and allocation parameters, or a stored loan smart contract, comprising a second specification comprising the identity and defining a late payment penalty for a loan originated by a lender, to:
send an event query via one or more communication networks to an oracle device external to the blockchain network, wherein the event query comprises the identity;
receive event data associated with the identity via the one or more communication networks and from the oracle device in response to the event query, wherein the event data is reported to the oracle device via a wide area network by a financial institution device that is separate from the blockchain node device and the oracle device;
determine a number of creditworthiness tokens based on an application of the allocation parameters to the event data;
allocate to the identity via the first wallet address the determined number of creditworthiness tokens and a first set of one or more transactions that are recorded in a distributed ledger database of the blockchain network and link the number of the creditworthiness tokens to the first wallet address;

query the oracle device via the one or more communication networks to determine that a late payment on the loan has been made, wherein the late payment penalty comprises a first subset of the number of creditworthiness tokens and the loan smart contract comprises a second wallet address associated with the lender; and automatically transfer the first subset of the number of creditworthiness tokens from the first wallet address to the second wallet address via a second set of one or more transactions recorded in the distributed ledger database.

12. The blockchain node device of claim 11, wherein the issuance smart contract further comprises execution timing parameters and the instructions, when executed by the processor, are further configured to cause the blockchain node device to send the event query at a time determined according to the execution timing parameters.

13. The blockchain node device of claim 11, wherein the instructions, when executed by the processor, are further configured to cause the blockchain node device to correlate the allocation parameters to the event data to determine the number of creditworthiness tokens.

14. The blockchain node device of claim 11, wherein the number of creditworthiness tokens corresponds to an impact of a type of a financial event on a creditworthiness of an entity, the type of the financial event is determined from the event data, and the identity corresponds to the entity.

15. The blockchain node device of claim 11, wherein each of the number of creditworthiness tokens is transferable and fungible and the instructions, when executed by the processor, are further configured to cause the blockchain node device to record in each of the number of creditworthiness tokens an indication of an original owner that is associated with the first wallet address.

16. The blockchain node device of claim 11, wherein the loan smart contract further defines collateral for the loan lender, the collateral comprises a second subset of the number of creditworthiness tokens and the loan smart contract comprises a second wallet address associated with the lender, and the instructions, when executed by the processor, are further configured to cause the blockchain node device to:

query the oracle device via the one or more communication networks to determine that the loan is in default; and automatically transfer the second subset of the number of creditworthiness tokens from the first wallet address to the second wallet address via a third set of one or more transactions recorded in the distributed ledger database.

\* \* \* \* \*